H. S. DICKINSON.
CASTER WHEEL LOCK FOR AGRICULTURAL IMPLEMENTS.
APPLICATION FILED OCT. 5, 1917.

1,302,016.

Patented Apr. 29, 1919.
2 SHEETS—SHEET 1.

Inventor
H. S. Dickinson
By his Attorneys
Rogers, Kennedy & Campbell

H. S. DICKINSON.
CASTER WHEEL LOCK FOR AGRICULTURAL IMPLEMENTS.
APPLICATION FILED OCT. 5, 1917.
1,302,016.
Patented Apr. 29, 1919.
2 SHEETS—SHEET 2.
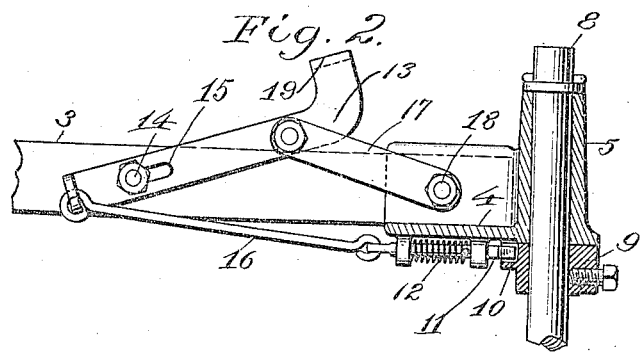
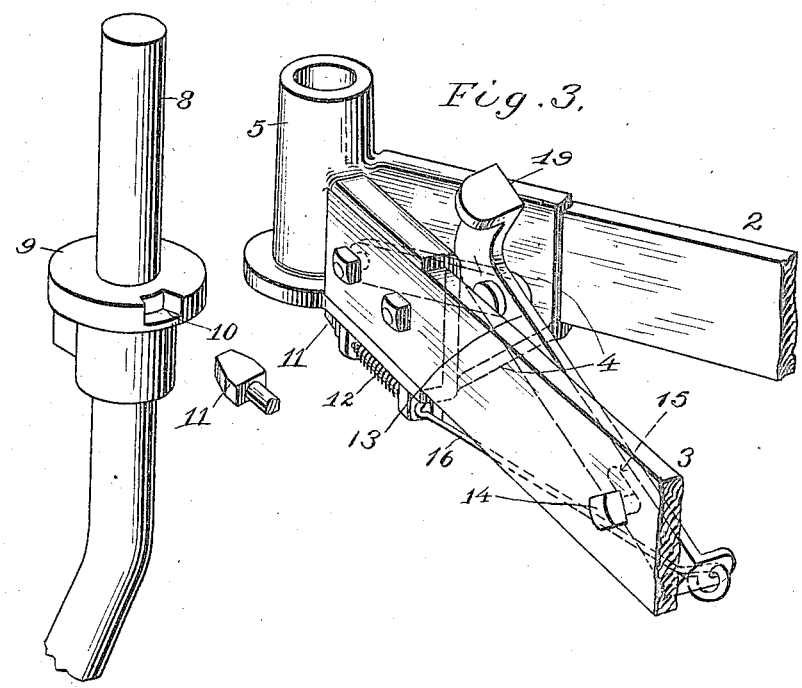
Inventor
H. S. Dickinson
By his Attorneys
Rogers, Kennedy & Campbell

UNITED STATES PATENT OFFICE.

HARRY S. DICKINSON, OF MOLINE, ILLINOIS, ASSIGNOR TO MOLINE PLOW COMPANY, A CORPORATION OF ILLINOIS.

CASTER-WHEEL LOCK FOR AGRICULTURAL IMPLEMENTS.

1,302,016.

Specification of Letters Patent.

Patented Apr. 29, 1919.

Original application filed February 21, 1917, Serial No. 149,981. Divided and this application filed October 5, 1917. Serial No. 194,883.

*To all whom it may concern:*

Be it known that I, HARRY S. DICKINSON, a citizen of the United States, residing at Moline, in the county of Rock Island and State of Illinois, have invented certain new and useful Improvements in Caster-Wheel Locks for Agricultural Implements, of which the following is a specification, reference being had therein to the accompanying drawing, being a division of original application filed February 21st, 1917, Ser. No. 149,981.

This invention relates to agricultural implements involving wheeled frames the rear ends of which are supported by caster wheels, and the invention consists of improved means for mounting the caster wheel on the frame and for controlling the swiveling or castering movements of the same.

My invention is shown in connection with a caster wheel structure in which a pair of wheels is employed to act as press wheels to cover the seed deposited by the seed discharging mechanism, but it will be understood that the invention is not limited in this respect and is applicable in connection with all caster wheel structures, whether for use in connection with plows or seeding machines or other agricultural implements.

In the accompanying drawings:

Fig. 2 is a longitudinal sectional elevation on an enlarged scale on the line *a—a* of Fig. 1, looking in the direction of the arrow in said figure.

Fig. 3 is a perspective view of the rear end of the machine frame and the upper end of the stem for the press wheels, said stem being removed from its bearings in the frame.

Figure 1:
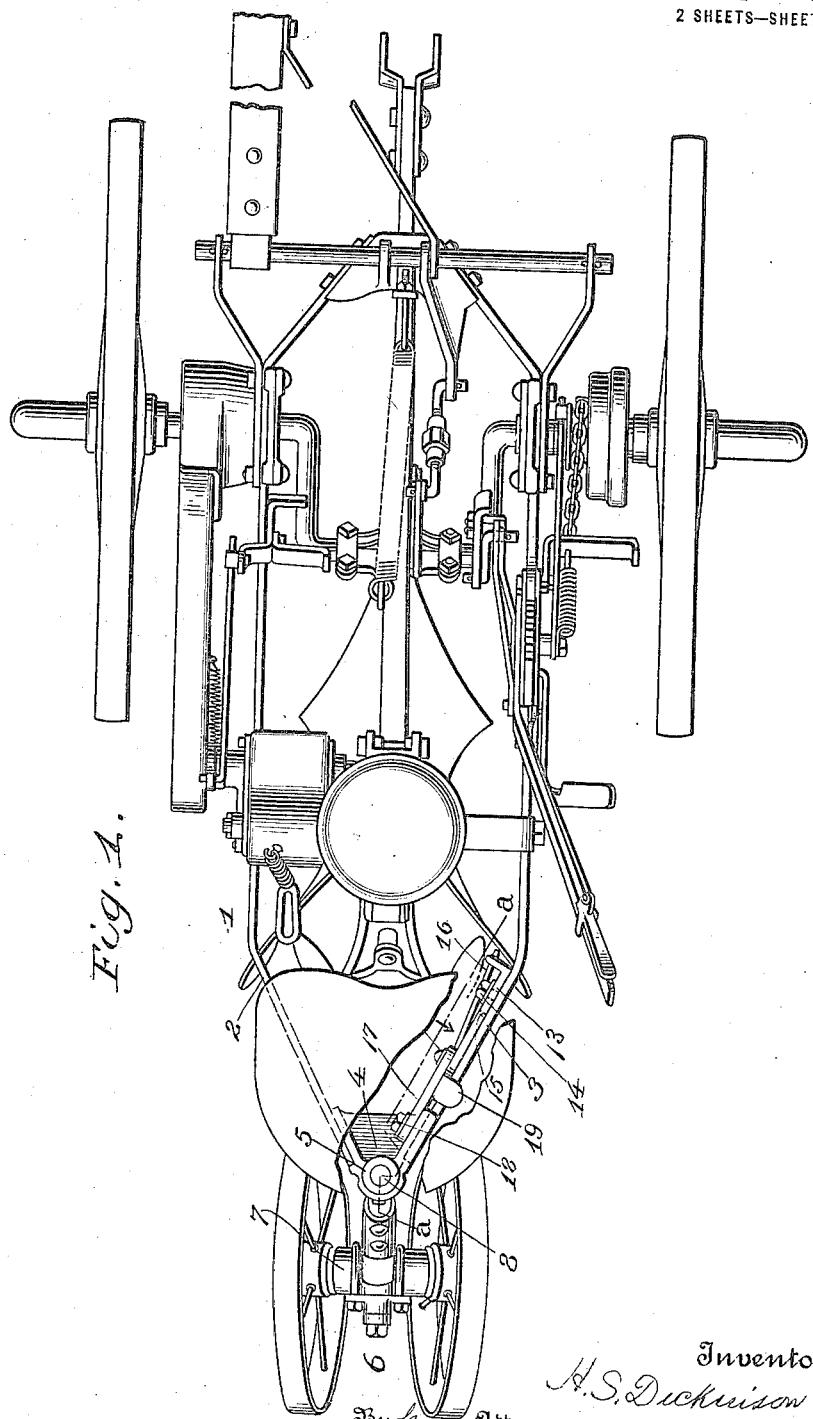
Figure 1 is a top plan view of the rear portion of the frame of a seed planting machine having my invention applied thereto.

Referring to the drawings:

1 designates the rear end of the machine frame including two frame bars 2 and 3 converging at their rear ends and connected together by a casting or block 4, which block is provided with a vertical bearing 5. 6 designates a press wheel structure comprising two press wheels mounted on the ends of a horizontal axle 7 on the lower end of a vertical stem 8, the upper end of which is mounted loosely in the bearing 5 so that the press wheels may swivel or caster about the vertical axis of the stem. Beneath the bearing the stem has fixed to it a collar 9 containing a notch 10 in its periphery, which notch is adapted to receive a horizontally endwise movable locking latch 11 mounted in guides on the under side of the block 4, the said latch being acted on by a spring 12 which tends to thrust it rearwardly against the periphery of the collar and to seat the latch in the notch. The latch and notch are so arranged with relation to the machine frame and axle 7, that when the latch is engaged in the notch the press wheels will be held from free swiveling action and will travel in line with the path of advance of the machine. The sides of the latch are beveled and the walls of the notch are likewise beveled so that if the wheels encounter undue resistance or pressure tending to turn the same and swivel the stem, the latch will be automatically pushed forwardly and disengage from the stem so as to release the stem. This automatic release of the caster wheels avoids the necessity on the part of the driver of unlocking the same at the end of the field or when turning, the pressure on the wheels brought about by the turning of the machine being sufficient to automatically retract the latch and thus release the wheels.

Provision is made for manually retracting the latch when desired, to release the stem so that the wheels may caster freely, which action is effected by means of a foot lever 13 pivoted near its forward end as at 14 on a horizontal axis to the frame bar 3 by means of a bolt passing through the frame bar and through a longitudinal slot 15 in the lever, whereby the lever is permitted to pivot on said bolt and also is capable of a limited endwise movement thereon. At its forward end the lever has connected with it a link 16 which extends rearwardly and has its rear end jointed to the rear end of the latch. Near its rear end the lever has pivoted to it a second link 17 which extends rearwardly and is pivoted as at 18 to the block 4.

Normally with the latch seated in the notch in the collar and held therein yieldingly by the spring, the foot lever will extend at an upward inclination and will be maintained yieldingly in its position by the latch spring. When now it is desired to release the stem to permit the press wheels to caster freely, the operator presses down on a lateral foot pad 19 on the rear end of the lever, which action will swing the lever and link 16 downwardly and at the same time will shift the lever forwardly endwise, thereby thrusting the link 18 forwardly and retracting the latch and releasing the stem. The downward movement is continued until the parts "pass center" and the foot pad brings up against the upper edge of the frame bar 3. In this position of the parts they will be locked and the latch will be held free of the collar on the stem. When the latch is to be active again in order to lock the stem, the driver lifts the foot pad upwardly with his toe, thereby breaking the locked connection of the parts and permitting the latch spring to again project the latch rearwardly into active position.

It will be understood from the foregoing description that in the normal operation of the machine traveling straight forward, the latch engages in the notch in the collar and locks the stem against free swiveling action so that the wheels will travel straight forward in the line of advance of the machine, and when it is desired to release the stem to permit the wheels to caster freely, the operator presses downwardly on the foot pad, this action retracting the latch and causing the same to be held locked in retracted position. The foot pad may now be lifted to unlock the latch so that it will automatically enter the notch when the machine straightens out in its travel, and the wheels take a position in line with the advance, the end of the latch before it enters the notch riding on the peripheral edge of the collar ready to be projected into the notch when the latter comes into alinement with the latch.

The mechanism is simple in its make-up, composed of few parts, and is effective in operation and not liable to become disarranged, and it affords a convenient and easily operated means of controlling the castering action of the wheels in a prompt and effective manner.

In the foregoing description and accompanying drawings I have disclosed my invention in the particular form and embodiment I prefer to adopt, which embodiment has been found in practice to answer to a satisfactory degree the objects in view. It will be manifest, however, that these details may be variously changed and modified by the skilled mechanic without departing from the limits of my invention; and it will be understood that the invention is not limited to any particular form or construction of the parts except in so far as such limitations are specified in the claims.

Having thus described my invention, what I claim is:

1. The combination of a frame, a member movably mounted therein, a shiftable locking latch sustained by the frame and adapted to interlock with said member, a fore-and-aft extending foot lever pivoted between its ends to the frame, and movable endwise to a limited extent on its pivot, said foot lever being provided on its rear end with a foot pad adapted to engage the frame, a fore-and-aft extending rod connected at its forward end to the forward end of the foot lever, and connected at its rear end to the latch, and a link pivoted at its rear end to the frame and at its forward end to the foot lever between the foot pad and pivot of the lever, the relation of the several pivots to the pivotal connection of the rod with the foot lever being such, that the foot lever when depressed will "pass center" and lock the latch in retracted position.

2. The combination of a frame, a member movably mounted therein, a shiftable locking latch sustained by the frame and adapted to interlock with said movable member, a foot lever pivoted between its ends to the frame and movable endwise relatively to the same, a link jointed to the frame and said foot lever in rear of said pivotal connection, and a link pivoted to the forward end of the foot lever and to the locking latch, whereby when the foot lever is depressed, the locking latch will be retracted to release the movable member, said parts being of such relative form and construction that when the foot lever is depressed it will "pass center" and lock the latch in retracted position.

In testimony whereof, I have affixed my signature.

HARRY S. DICKINSON.

Copies of this patent may be obtained for five cents each, by addressing the "Commissioner of Patents, Washington, D. C."